PROCESS FOR PREPARING LEAD ORGANIC COMPOUNDS

Pietro Pagliarini, Fidenza, and Roberto Magri and Roberto Stefanini, Salsomaggiore, Italy, assignors to C.I.P. Compagnia Italiana Petrolio S.p.A., Fidenza, Italy, a company of Italy
No Drawing. Filed Dec. 8, 1960, Ser. No. 74,455
Claims priority, application Italy Dec. 11, 1959
3 Claims. (Cl. 260—437)

This invention relates generally to a process for preparing lead organic compounds, and more particularly is directed to a catalytic process for obtaining, by the reaction of lead-sodium alloys with alkyl or aryl halides, compounds such as tetraethyl lead, tetramethyl lead, mixed ethyl-methyl lead compounds and the like.

The conventional process for making tetraethyl lead consist in reacting a Pb-Na alloy with ethyl chloride at a temperature between 50° C. and 100° C. and, in general, at superatmospheric pressures. It is also known that these chemical operations can be performed either as a batch process or in a continuous run.

In either case, the time taken for the completion of the reaction (autoclaving takes 5 hrs., or more than that) has a vital commercial importance: any reduction of the processing time is conducive to significant cost reductions.

A common drawback of the conventional procedure lies in that stay periods and high reaction speed periods occur alternately: and the periods of high reaction speed not only are dangerous for the operators, but are such as to impair the final yields considerably.

An object of the present invention is to reduce the reaction times required in the preparation of the lead organic compounds of the class described.

Another object of the present invention is to form a reaction mass which is much more homogeneous than those obtained according to prior art procedures, so that the separation of the tetraethyl lead and allied compounds, either by steam distillation of the reacted mixture, or by solvent extraction, is greatly facilitated.

In accordance with an important aspect of the invention, the reaction of a lead-sodium alloy with an alkyl or aryl halide is effected in the presence of catalytic amounts of at least one compound selected from the group consisting of furan, alpha-methyl-furan, alpha, alpha'-dimethyl furan, tetrahydrofuran, coumarone, coumaran, dibenzofuran.

According to a preferred embodiment of this invention, the amount of the selected catalyst that is employed is from 0.02 percent to 2.0 percent, based on the weight of the sodium-lead alloy.

Among the catalysts that may be employed according to the present invention, tetrahydrofuran has proven to be one of the most suitable and efficient: the optimal amount of tetrahydrofuran to be employed is, as mentioned above, from 0.02 percent to 2.0 percent, based on the weight of the lead-sodium alloy. Amounts of catalyst in excess of 2.0 percent, on the above indicated basis, do not afford any additional advantage.

However, if the reacting alkyl (or aryl) halide is in great excess with respect to the sodium-lead alloy, it is suggested that the amount of catalyst be increased sufficiently as to have a concentration, on a weight basis, of not less than 0.05 to 0.1 percent of the alkyl (or aryl) halide.

The invention will now be further described, but not limited, by reference to the following examples, in which all the measures are given in the decimal systems and the temperatures are in degrees centigrade.

EXAMPLE 1

One hundred grams of Pb-Na alloy, containing 10% Na by weight are autoclaved with 130 ml. of ethyl chloride, a quantity equivalent to 120 grams; the autoclave is kept for 3 hrs. at 70° C., after which the reaction mass, on cooling, is analyzed and it is found that, by employing this conventional procedure, a yield as low as 78.4% of the theoretical amount is obtained.

Five further tests were effected, under the conditions above described, but in the presence of variable quantities of tetrahydrofuran. In the following Table No. 1, the results of all six tests, i.e. with and without tetrahydrofuran are summarized.

Table No. 1

| Test No. | Tetrahydrofuran, mls. added | Yield in percent of thearetical yield |
|---|---|---|
| 1 | None | 78.4 |
| 2 | 0.10 | 79.6 |
| 3 | 0.20 | 80.2 |
| 4 | 0.30 | 83.5 |
| 5 | 0.50 | 84.5 |
| 6 | 0.80 | 84.1 |

On examining the above tabulated data, it is apparent that a tetrahydrofuran addition from about 0.20 to about 0.50 ml. is followed by an increase in the final yield and that larger additions do not afford any special advantage, thus confirming the criticality of the catalyst additions.

EXAMPLE 2

Another set of tests was performed, with the same quantities of reactants, i.e. alloy and ethyl chloride, as set forth in Example 1 above: the tetrahydrofuran addition was, for all of the tests, 0.3 ml. and the influence of the temperature on the final yield was investigated. The results are tabulated in Table 2.

Table No. 2

| Test No. | Temperature, ° C. | Yield in percent of the theoretically available yield |
|---|---|---|
| 1 | 65 | 83.0 |
| 2 | 70 | 83.5 |
| 3 | 72 | 88.6 |
| 4 | 75 | 91.0 |
| 5 | 85 | 93.0 |

EXAMPLE 3

By employing the same amounts of reactants as in the preceding examples, there were conducted three tests, of a duration of 3 hrs. and at 85° C. The first test was made without any added catalyst, whereas the other two tests were conducted in the presence of 0.4 gram and 0.15 gram of coumarone, respectively. The yield of the test without added catalyst was 81% of the theoretically available yield, while the test with 0.4 gram of coumarone added had a yield of 89%, and that with 0.15 gram coumarone added gave a yield of 83% of the theoretical yield.

EXAMPLE 4

With the same amounts of reactants indicated for the preceding examples, two tests, of a duration of 3 hrs. and at a temperature of 85° C., were conducted. The first test, carried out without any added catalyst, had a yield of 81% of the theoretical yield. The second text, effected with the addition of 0.5 gram of coumaron, gave a yield of 88.7% of the theoretical yield.

EXAMPLE 5

Two tests, under the same conditions as Example 4, were carried out: the first test without catalysts and the second with the addition of one gram of dibenzofuran (biphenylene oxide). The yield of the first test was 80.5%, that of the second test was 88% of the theoretical yield.

EXAMPLE 6

Under the same conditions given for the preceding Examples 4 and 5, there were conducted two tests, the first without added catalysts, and the second one with the addition of 1 gram of alpha-methyl-furan. While the yield of the first test with respect to the theoretical yield was 80%, the second test gave a yield of 89%.

EXAMPLE 7

The same conditions as in the preceding Examples 4, 5 and 6 were applied to two additional tests. The first test, with no catalyst added, gave a yield of 80% of the theoretical yield, while the second test, carried out in the presence of 1 gram of alpha,alpha'-dimethyl furan gave a yield of 87%.

EXAMPLE 8

A test was carried out under the same conditions of Example 1, while employing 100 grams of Na-Pb alloy and 140 grams of ethyl chloride. On completion of the reaction, the reacted mass was further reacted with 230 ml. of an ethereal solution of $$MgC_2H_5Cl.2C_2H_5OC_2H_5$$

(corresponding to 16 grams of elemental magnesium), obtained by reaction of elemental magnesium, ethyl chloride and ether. The reaction was continued for 2 hrs., at 85° C., after which there were obtained 108 grams of tetraethyl lead.

A second test was carried out under the same conditions, but in the presence of 0.5 gram of tetrahydrofuran. The collected tetraethyl lead was now 117 grams.

EXAMPLE 9

A test was carried out under the same conditions as Example 1, by employing 100 grams of lead-sodium alloy and 140 grams ethyl chloride. On completion of the reaction, the excess ethyl chloride was discharged from the autoclave and the reacted mass was further treated with 180 ml. of an ethereal solution of $$MgCH_3Cl.2C_2H_5OC_2H_5$$

(obtained, in turn, by reacting elemental magnesium, methyl chloride and ether) and with 100 grams methyl chloride. The reaction was allowed to go on 4 hrs. approx. at 80° C. The total yield of lead organic compounds was 78 grams. A second test, carried out under the same conditions, but with the addition of 0.5 gram tetrahydrofuran gave a yield of 90 grams of lead organic compounds.

It is to be added that the furan group catalysts of the present invention are fully compatible with other promoters of the formation of tetraethyl lead commonly used in the manufacture of the latter. Among these commonly adopted promoters, improvers and additives, there can be listed acetates, butyrates and other esters, acetals, ketones, styrene, naphthalene, aldehydes, lecithin, amines, amides, salts such as bromides and iodides, metals and metalloids such as potassium, magnesium, calcium and iodine: all these can be profitably used concurrently with the catalysts of the present invention.

We claim:

1. A process for preparing lead organic compounds comprising reacting a lead and sodium alloy with a compound selected from the group consisting of alkyl and aryl halides, in the presence of catalytic amounts of at least one compound selected from the group consisting of furan, alpha-methyl furan, alpha,alpha'-dimethyl furan, tetrahydrofuran, coumarone, coumaran and dibenzofuran.

2. A process according to claim 1, wherein said catalyst is added to the reacting alloy and organic halides in an amount ranging from about 0.02 percent to about 2.0 percent, based on the weight of said sodium-lead alloy.

3. The process of preparing tetraethyl lead which comprises reacting lead-sodium alloy and ethyl chloride in the presence, as a catalyst, of from about 0.02 percent to about 2.0 percent based on the weight of said alloy, of at least one compound selected from the group consisting of furan, alpha-methyl furan, alpha,alpha'-dimethyl furan, tetrahydrofuran, coumarone, coumaran and dibenzofuran.

References Cited in the file of this patent

UNITED STATES PATENTS 2,848,471    Pagliarini            Aug. 19, 1958